United States Patent [19]

Pedemonte et al.

[11] Patent Number: 6,015,439
[45] Date of Patent: Jan. 18, 2000

[54] DEEP BLACK DYE MIXTURES OF FIBER-REACTIVE AZO DYES AND A PROCESS FOR DYEING HYDROXY AND/OR CARBOXAMIDO CONTAINING FIBERS

[75] Inventors: Ron Pedemonte, Eppstein-Vockenhausen; Andreas Stroben, Odenthal, both of Germany

[73] Assignee: Dystar Textilefarben GmbH & Co., Frankfurt am Main, Germany

[21] Appl. No.: 09/249,756

[22] Filed: Feb. 16, 1999

[51] Int. Cl.[7] .................................................. C09B 62/00
[52] U.S. Cl. ......................................... 8/549; 8/641; 8/546
[58] Field of Search ................................. 8/543–549, 641

[56] References Cited

U.S. PATENT DOCUMENTS

| | | |
|---|---|---|
| 5,349,057 | 9/1994 | Büch et al. . |
| 5,780,602 | 7/1998 | Schumacher et al. ................... 534/642 |
| 5,931,976 | 8/1999 | Pedemonte et al. . |

FOREIGN PATENT DOCUMENTS

| | | |
|---|---|---|
| 63-178170 | 7/1988 | Japan . |
| 1-315469 | 12/1989 | Japan . |
| 2073-870 | 3/1990 | Japan . |
| 2202956 | 8/1990 | Japan . |
| 07097533 | 4/1995 | Japan . |
| 07324172 | 12/1995 | Japan . |
| 9169921 | 6/1997 | Japan . |
| 9169923 | 6/1997 | Japan . |
| 9108343 | 6/1988 | Rep. of Korea . |
| 25263 | 2/1999 | Rep. of Korea . |

*Primary Examiner*—Margaret Einsmann
*Attorney, Agent, or Firm*—Connolly Bove Lodge & Hutz LLP

[57] ABSTRACT

A dye mixture comprising one or more disazo dyes composed of 1-amino-3,6-disulfo-8-naphthol as the coupling component and of two diazo components of the aniline series containing each a fiber-reactive group of the vinylsulfone series and one or more monoazo dyes composed of a cyanoamido- or morpholino- or amino-substituted chlorotriazinylamino-sulfo-naphthol coupling component and a diazo component of the aniline series containing a fiber-reactive group of the vinylsulfone series, which dye mixtures yield on hydroxy- and/or carboxamido-containing fiber materials, such as cellulose fibers, in particular cotton, or on, for example, wool and synthetic polyamide fibers, deep black dyeings.

12 Claims, No Drawings

DEEP BLACK DYE MIXTURES OF FIBER-REACTIVE AZO DYES AND A PROCESS FOR DYEING HYDROXY AND/OR CARBOXAMIDO CONTAINING FIBERS

The present invention relates to the field of fiber-reactive dyes.

Black-dyeing mixtures of fiber-reactive dyes are known from U.S. Pat. No. 5,780,602, from Japanese Patent Application Publications Sho-63-178 170, Hei-1-315 469, Hei-2-073 870, Hei-2-202 956, Hei-7-097 533, Hei-7-324 172, Hei-9-169 921 and Hei-9-169 923 as well as from Korean Patent Application Publications No. 84-2785 and 91-8343. However, these dye mixtures have still some deficiencies, such as, for ex., when applied to substrates other than cellulose, for example wool.

With the present invention, deep black-dyeing dye mixtures have been found which unexpectedly and surprisingly have improved properties, such as improved resistance to ammonium aftertreatment and levelness in regard to the dyeing of wool. The present invention discloses dye mixtures comprising one or more, such as one, two or three, disazo dyes conforming to the general formula (1) shown and defined below, and one or more, such as one, two, three or four, monoazo dyes conforming to the general formula (2), the dye, respectively dyes, of the general formula (1) being present in the mixtures in an amount of from 50 to 95% by weight, preferably of from 75 to 90% by weight, and the dye, respectively dyes, of the general formula (2) being present in the dye mixtures in an amount of from 5 to 50% by weight, preferably of from 10 to 25% by weight, R is hydrogen or sulfo, preferably hydrogen;

$Y^1$ is vinyl, or is ethyl substituted in the β-position by a substituent which is eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and $Y^1$ is preferably vinyl, β-chloroethyl, β-thiosulfatoethyl or β-sulfatoethyl and is in particular preferably vinyl or β-sulfatoethyl;

$Y^2$ has one of the meanings of $Y^1$;

$Y^3$ has one of the meanings of $Y^1$;

Z is cyanoamino, morpholino or a group of the general formula (20)

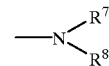

(20)

wherein $R^7$ is hydrogen, alkyl of 1 to 4 carbon atoms, such as methyl and ethyl, cyclohexyl, alkoxyalkyl of 3 to 6 carbon atoms, such as methoxyethyl and ethoxyethyl, hydroalkyl of 2 to 4 carbon atoms or sulfoalkyl of 1 to 4 carbon atoms and $R^8$ has one of the meanings given for $R^7$;

M is hydrogen or an alkali metal, such as lithium, sodium and potassium; the groups $-SO_2-Y^1$, $-SO_2-Y^2$ and $-SO_2-Y^3$ are preferably bonded to the benzene ring meta or para to the azo group.

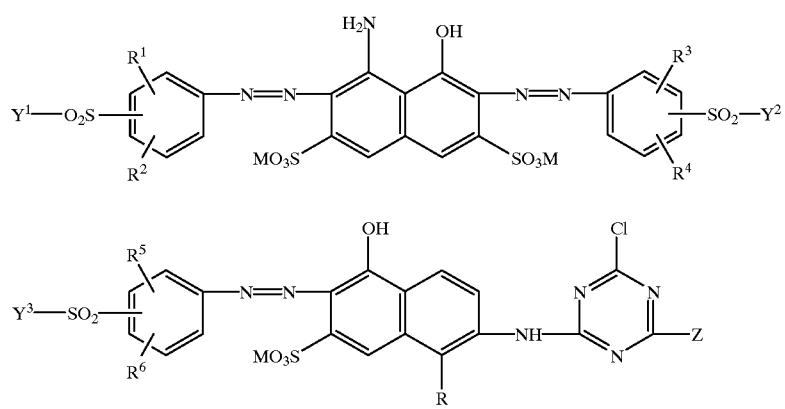

in which:

$R^1$ is hydrogen, methyl, ethyl, methoxy, ethoxy, sulfo or carboxy, preferably methoxy or hydrogen and in particular hydrogen;

$R^2$ is hydrogen, methyl, ethyl, methoxy, ethoxy, sulfo or carboxy, preferably hydrogen;

$R^3$ is hydrogen, methyl, ethyl, methoxy, ethoxy, sulfo or carboxy, preferably methoxy or hydrogen and in particular hydrogen;

$R^4$ is hydrogen, methyl, ethyl, methoxy, ethoxy, sulfo or carboxy, preferably hydrogen;

$R^5$ is hydrogen, methyl, ethyl, methoxy, ethoxy, sulfo or carboxy, preferably methoxy or hydrogen and in particular hydrogen;

$R^6$ is hydrogen, methyl, ethyl, methoxy, ethoxy, sulfo or carboxy, preferably hydrogen;

In particular, the dye mixtures according to the invention may comprise one or two or three dyes conforming to general formula (2) wherein R is hydrogen, and one, two or three dyes conforming to the general formula (2) wherein R is sulfo.

Both in the formulae mentioned above and in those below, the individual formula members, both with different and with the same designation within a formula or the various formulae, can within the scope of their definitions have meanings which are the same as or different from one another.

The groups "sulfo", "thiosulfato", "carboxy", "phosphate" and "sulfato" include both the acid form and the salt form of these groups. Accordingly, sulfo groups are groups of the formula $-SO_3M$, thiosulfato groups are groups of the formula $-S-SO_3M$, carboxy groups are groups of the formula —COOM, phosphato groups are groups of the formula —OPO$_3$M$_2$ and sulfato groups are groups of the formula —OSO$_3$M, in which M is defined as above.

The dyes according to the general formula (1) are known from the U.S. Pat. Nos. 2,657,205, 3,387,914, 4,072,463 and 4,257,770 or from one of the above-mentioned publications, and the dyes of the general formula (2) are known from German Offenlegungsschrift No. 3,245,743 and U.S. Pat. No. 5,349,057.

The dye mixtures of the invention may additionally contain one, two or three dyestuffs corresponding to the general formula (3a) or (3b) or both

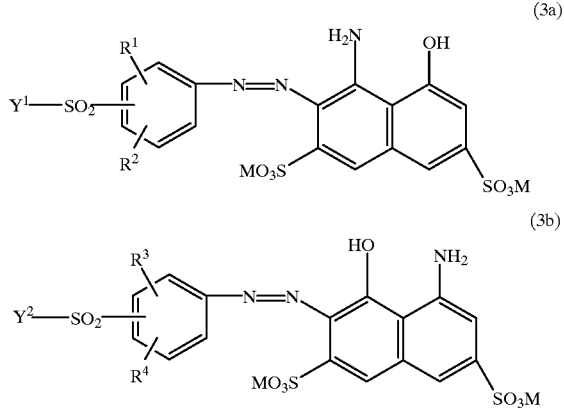

in which $R^1$, $R^2$, $R^3$, $R^4$, M, $Y^1$ and $Y^2$ are defined as above. These two monoazo dyestuffs may be present already in the component of formula (1) of the mixture and may be formed during the synthesis of the disazo dye of formula (1) when coupling reactions of the starting compounds are incomplete.

If the dye mixture of the instant invention contains, as a further component, a monoazo dyestuff of formula (3a) or of formula (3b) or both, the dye or dyes of formula (3a) or of formula (3b) or of both are present in the dye mixture of the dyes of formula (1) and (2) in the range of 0.01 to 8% by weight, calculated on the 100% dye mixture of the dyes (1) and (2).

The dye mixtures according to the invention may also additionally comprise a yellow or red shading dye in an amount of up to about 5% by weight, calculated on the 100% dye mixture of the dyes (1) and (2). Known dyes of this type are for example azo dyes conforming to the formulae (a), (b), or (c)

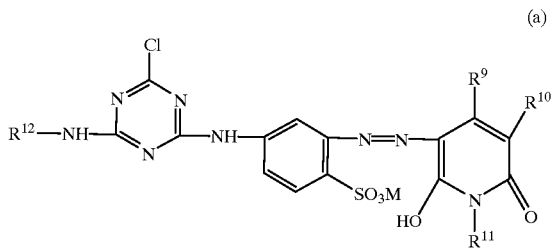

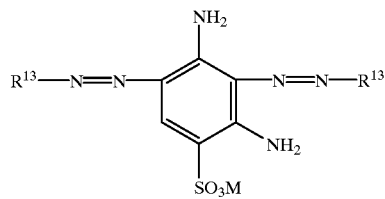

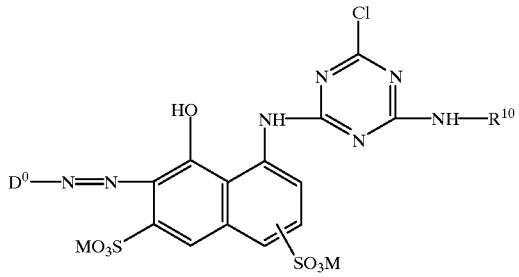

in which $R^9$ is hydrogen or methyl, $R^{10}$ is hydrogen, cyano, carbamoyl, carboxy or sulfomethyl, $R^{11}$ is methyl or ethyl, $R^{12}$ is 3-(β-sulfatoethylsulfonyl)phenyl, 4-(β-sulfatoethylsulfonyl)phenyl, 3-vinylsulfonylphenyl or 4-vinylsulfonylphenyl, $R^{13}$ is 3-(β-sulfatoethylsulfonyl)phenyl, 4-(β-sulfatoethylsulfonyl)phenyl, 3-vinylsulfonylphenyl or 4-vinylsulfonylphenyl, $R^{14}$ is 3-(β-sulfatoethylsulfonyl)phenyl, 4-(β-sulfatoethylsulfonyl)phenyl, 3-vinylsulfonylphenyl or 4-vinylsulfonylphenyl, $D^O$ is 1-sulfo-naphth-2-yl, 5-sulfo-naphth-2-yl or 1,5-disulfo-naphth-2-yl, and M is defined above.

The dyes of the general formulae (1), (2), (3a) and (3b), in particular if those corresponding to the same general formula have the same chromophore, can have, within the meaning of their Y-moiety, structurally different fiber-reactive groups corresponding to their —SO$_2$—Y-moiety. In particular, the dye mixture can contain dyes of the same chromophore conforming to the formula (1) and/or dyes of the same chromophore conforming to formula (2) and optionally likewise of the general formula (3a) or (3b) or both in which the fiber-reactive groups of the corresponding —SO$_2$—Y-moiety are partly vinylsulfonyl groups and partly groups in which the Y-moiety is a β-ethyl substituted group as defined above, such as β-chloroethylsufonyl, β-thiosulfatoethylsulfonyl or, preferably, β-sulfatoethylsulfonyl groups. If the dye mixtures contain the respective dye components in the form of a vinylsulfonyl dye, the proportion of the respective vinylsulfonyl dye to the respective dye with a Y-moiety being a β-ethyl substituted group as defined above, such as a β-chloro- or β-thiosulfato- or β-sulfatoethyl-sulfonyl dye, will be up to about 30 mol-%, based on the respective dye chromophore. Preference is here given to the dye mixtures in which the proportion of vinylsulfonyl dye to said β-substituted ethylsulfonyl dye, such as β-sulfatoethylsulfonyl dye, is in terms of the molar ratio between 2:98 and 30:70.

Radicals of the formulae (4), (5) and (6)

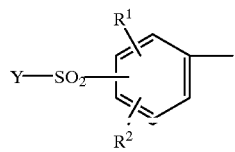
(4)

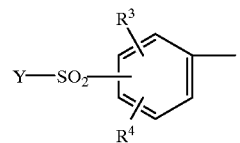
(5)

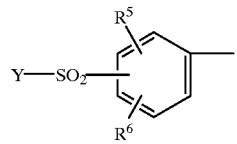
(6)

in the dyes of formulae (1), (2), (3a) and (3b) are, for example, 2-(β-sulfatoethylsulfonyl)phenyl, 3-(β-sulfatoethylsulfonyl)phenyl, 3- or 4-vinylsulfonylphenyl, 4-(β-sulfatoethylsulfonyl)phenyl, 2-carboxy-5-(β-sulfatoethylsulfonyl)phenyl, 4-methoxy-3-(β-sulfatoethylsulfonyl)-phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl and 3- or 4-(β-acetoxyethylsulfonyl)phenyl and their corresponding vinylsulfonyl derivatives.

Preference is given to dye mixtures according to the invention, in which the formula members $R^1$, $R^2$, $R^3$ and $R^4$ as well as $R^5$ and $R^6$ have one of the preferred meanings indicated above, and are in particular preferred each hydrogen; furthermore, the particular Y-moieties of the corresponding dyes of the mixture are each preferably, independently of the other one, vinyl or β-sulfatoethyl. The dye mixtures according to the invention thus represent in particular mixtures containing one or more, such as one, two or three, preferably one or two, disazo dyes conforming to the general formula (1A), and one or more monoazo dyes, such as one, two, three or four, preferably one or two, monoazo dyes conforming to the general formula (2A)

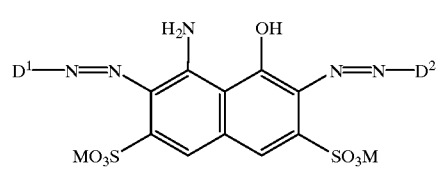
(1A)

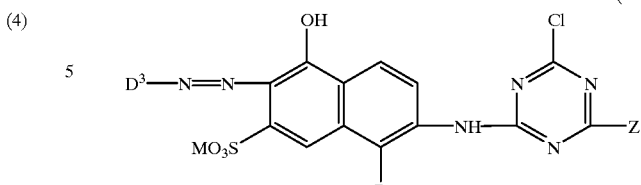
(2A)

and optionally containing one, two or three monoazo dyes of the formula (3a–A) or of (3b–A) or of both

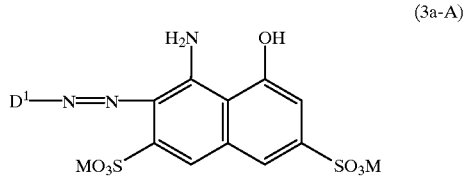
(3a-A)

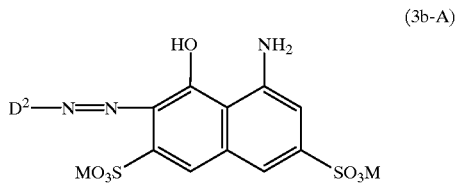
(3b-A)

in which formulae M, R and Z are as defined above and $D^1$ is a group of the formula (4), $D^2$ is a group of the formula (5) and $D^3$ is a group of the formula (6), wherein $Y^1$, $Y^2$ and $Y^3$ are each, independently of the others, preferably vinyl or β-sulfatoethyl and the other formula radicals having one of the meanings, in particular preferred meanings, as given in their definitions above, and wherein $D^1$, $D^2$ and $D^3$ are preferably each independently of the others 3-vinylsulfonyiphenyl, 4-vinyisulfonylphenyl, 3-(β-sulfatoethylsulfonyl)phenyl or 4-(β-sulfatoethylsulfonyl) phenyl, while the weight-ratios of these dyes are those which have been given above for the mixtures of the formulae (1) and (2) and optionally formulae (3a) and (3b).

The dye mixtures of the invention can be present as a preparation in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dye mixtures take the form of dye powders, they contain, as a rule, 10 to 80% by weight, based on the dye powder or preparation, of a strength-standardizing colorless diluent electrolyte salt, such as those mentioned above. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, the electrolyte salt content of these aqueous solutions preferably being below 10% by weight, based on the aqueous solutions (liquid preparations) can in general contain the abovementioned buffer substances in an amount of up to 5% by weight, preferably up to 2% by weight.

The dye mixtures of the invention can be obtained in a conventional manner, for instance by mechanically mixing the individual dyes in the required proportions or by chemical synthesis by means of the customary diazotization and coupling reactions using appropriate mixtures of the diazo and coupling components in a manner familiar to those skilled in the art and the necessary proportions. One option is for example to prepare aqueous solutions of the coupling component 1-amino-8-naphthol-3, 6-disulfonic acid and of one or two coupling components of the general formula (7)

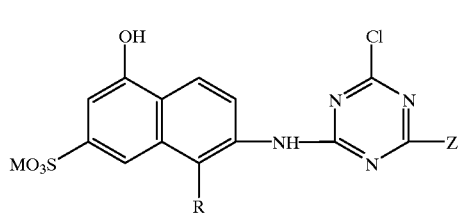

(7)

in which M, R and Z are defined as above, as well as of the aniline compounds of the formulae (8), (9) and (10) as diazo components

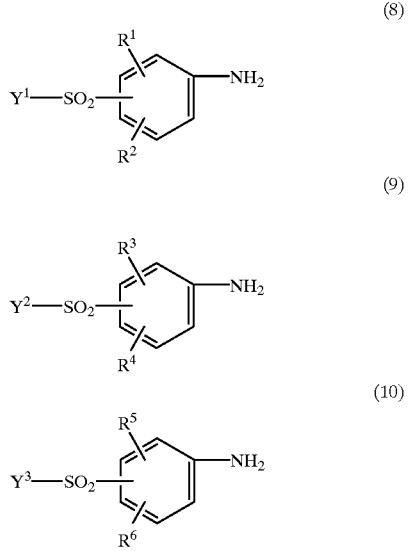

(8)

(9)

(10)

where $R^1$ through $R^6$ and $Y^1$ through $Y^3$ are each as defined above, in the same reaction batch in appropriate proportions, diazotizing these aniline compounds in a conventional manner in a strongly acid medium and carrying out the coupling reactions at a temperature of 10 to 20° C. and at a pH first of below 1.5 while raising the pH-value of the reaction batch after completion of the first coupling step to a pH of between 3 and 6. A further embodiment to synthesize the dye mixture according to the invention by chemical reaction is, for example, to diazotize, in the same reaction batch, aniline compounds of the general formulae (8) and (9) with 1-amino-8-naphthol-3, 6-disulfonic acid, as mentioned above, at a pH of below 1.5 and at a temperature of 10 to 20° C., and thereafter slowly adding an alkaline reacting agent, such as sodium carbonate, to adjust a pH of between 3 and 6, thus causing the further coupling reactions to form the disazo dye of formula (1), and then adding an aqueous solution of a coupling component of the general formula (7) as well as an aqueous solution or suspension of the diazotized aniline of general formula (10) while maintaining the pH of 3 to 6 and at a temperature of 10 to 20° C., to form the monoazo dye of the general formula (2).

The dye mixtures according to the invention thus obtained can be isolated from the solution by the conventional manner, for example by salting out with an electrolyte salt, such as sodium chloride or potassium chloride, or by spray-drying.

Dye mixtures of the invention in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the above-mentioned method by using appropriate vinylsulfonyl starting anilines, but also by reacting the dye mixture in which the particular Y-moiety is a β-chloroethyl, β-thiosulfatoethyl or β-sulfatoethyl group, with an amount of alkali required for only part of these groups and converting part by said β-substituted ethylsulfonyl groups into vinylsulfonyl groups. This measure is carried out by generally known methods of converting β-substituted ethylsulfonyl groups into the vinylsulfonyl group.

The dye mixtures of the instant invention are well suitable for dyeing (which includes printing) hydroxy- and/or carboxamido-containing fiber materials by the application and fixing methods numerously described in the art for fiber-reactive dyes, in deep black shades with good color build-up and good wash-off in respect of unfixed dye portions.

The present invention therefore also provides for use of the dye mixtures according to the invention for dyeing (including printing) hydroxy- and/or carboxamido-containing fiber materials and also processes for dyeing such fiber materials employing a dye mixture according to the invention by applying the dye mixture to the substrate in dissolved form and fixing the dyes on the fiber by the action of an alkaline reacting agent or by heating or by both measures.

The present invention therefore also provides for use of the novel dye mixtures for dyeing (including printing) hydroxy- and/or carboxamido-containing fiber materials and processes for dyeing such fiber materials and processes for dyeing such materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The Examples which follow illustrate the invention. Parts and precentages are by weight, unless otherwise stated. The parts by weight bear the same relation to parts by volume as the kilogram to the liter.

EXAMPLE 1

200 parts of an electrolyte-containing dye powder which contains the navy-dyeing disazo dye of the formula (A)

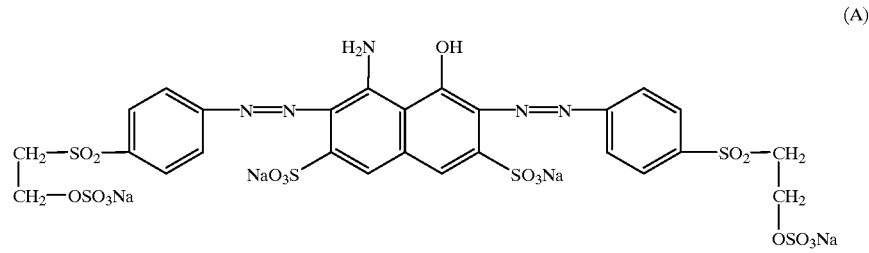

(A)

in a proportion of 50% are mechanically mixed with 28 parts of an electrolyte-containing dye powder which contains the golden orange-dyeing monoazo of the formula (B)

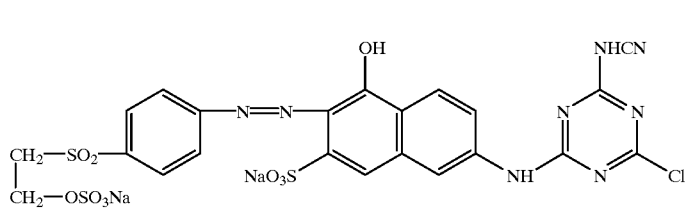

(B)

in a 70% proportion. The resulting dye mixture according to the invention, when employed according to the the application and fixing methods customary in the art for fiber-reactive dyes, produces for example on wool fiber materials dyeings in deep black shades.

EXAMPLE 2

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 143 parts of 1-amino-8-naphthol-3,6-disulfonic acid are added and the first coupling is carried out at a pH between 1 and 1.3 and at a temperature below 20° C. (the pH is maintained with about 50 parts of sodium bicarbonate). In a separate reaction, 18.4 parts of cyanuric chloride are suspended in ice-water and acylated with 4.2 parts of cyanamide at 0 to 5° C. and a pH of 7 to 10. The resulting product is then further acylated with 23.9 parts of 7-amino-4-hydroxy-naphthalene-2-sulfonic acid in weakly acidic solution at a temperature of 20 to 40° C. The resulting 7-(4'-chloro-6'-cyanoamino-1',3',5'-triazin-2'-yl)amino4-hydroxynaphthalene-2-sulfonic acid coupler solution is added to the above coupling mixture and the pH is raised to 3 to 6 with sodium carbonate at a temperature below 20° C.

A deep black dye solution is obtained containing the dyes of formulae (A) and (B) mentioned in Example 1 in the ratio of 90%:10%. This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on wool.

EXAMPLE 2a

The method described in Example 2 can be used to prepare a similar dye mixture by varying the amount used of starting compounds, for example the amount of 1-amino-8-naphthol-3,6-disulfonic acid in an amount of 127.6 parts, the amount of 7-amino4-hydroxy-naphthalene-2-sulfonic acid in an amount of 47.8 parts, the amount of cyanuric chloride in an amount of 36.8 parts, and cyanoamine in an amount of 8.4 parts.

A dye mixture is obtained in which the dyes of formulae (A) and (B) are present in the ratio of about 80%:20%. The dye mixture can be isolated from the synthesis solution, for example by spray drying, or else be used directly as a liquid for dyeing. Employed according to the application and fixing methods customary in the art for fiber-reactive dyes, it produces for example on wool fiber materials dyeings in deep black shades.

EXAMPLE 2b

The method described in Example 2 can be used to prepare a similar dye mixture by varying the amount used of starting compounds, for example the amount of 1-amino-8-naphthol-3,6-disulfonic acid in an amount of 119.6 parts, the amount of 7-amino-4-hydroxy-naphthalene-2-sulfonic acid in an amount of 59.8 parts, the amount of cyanuric chloride in an amount of 46 parts, and cyanoamine in an amount of 10.5 parts.

A dye mixture is obtained in which the dyes of formulae (A) and (B) are present in the ratio of about 75%:25%. The dye mixture can be isolated from the synthesis solution, for example by spray drying, or else be used directly as a liquid for dyeing. Employed according to the application and fixing methods customary in the art for fiber-reactive dyes, produces for example on wool fiber materials dyeings and in deep black shades.

EXAMPLE 3

To prepare a dye mixture in which some of the dyes have β-sulfatoethylsulfonyl groups while the rest has as vinylsulfonyl groups, the solution of the dye mixture according to the invention prepared in Example 2 is used as the starting point. 25% by volume of this solution is separated off, adjusted with sodium carbonate to a pH of 8 to 10 and subsequently stirred at 30 to 40° C. for a further 30 minutes, in the course of which the β-sulfatoethylsulfonyl groups are transformed into vinylsulfonyl groups. Thereafter sulfuric acid is used to lower the pH to 4.0 to 5.0, and this solution of the vinylsulfonyl dye mixture is added to the original solution of the β-sulfatoethylsulfonyl dye mixture. The result is an aqueous solution of dyes conforming to the formulae (A-1) and (B-1)

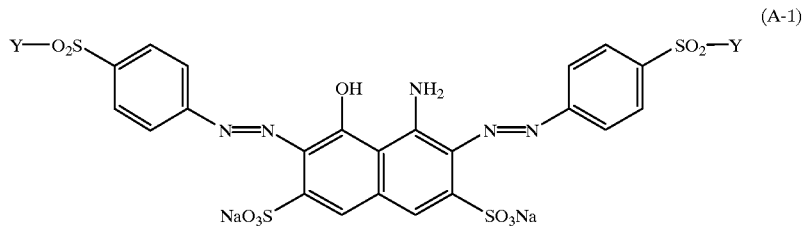

-continued

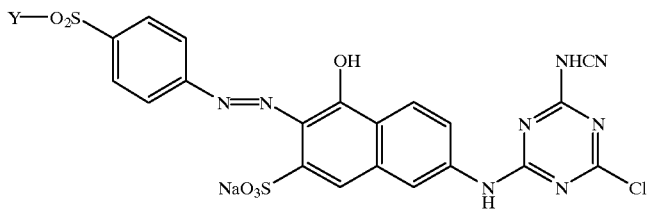

(B-1)

where Y is 25% vinyl and 75% β-sulfatoethyl.

The filtrate is adjusted with 5 parts of sodium phosphate buffer to a pH of 4.5. By adding or evaporating water, this aqueous solution can be adjusted to the strength desired for a liquid preparation and be used directly for dyeing. When the customary application and fixing methods in the art for fiber-reactive dyes are employed deep black shades are produced.

EXAMPLE 4

A dye mixture according to the invention is prepared by preparing the disazo dye of to the formula (A) and the monoazo dye (C)

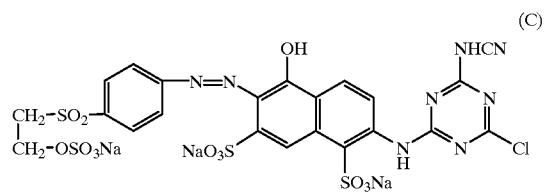

(C)

as follows: To a suspension of 281 parts of 4-(β-sulfatoethylsulfonyl)aniline in 650 parts of ice-water and 180 parts of 30% aqueous hydrochloric acid, 173 parts of 40% strength aqueous sodium nitrite solution are added under good stirring at 0 to 50° C. 143 parts of 1-amino-8-napthol-3,6-disulfonic acid are then added, and the first coupling is carried out at a pH between 1 and 1.3 and at a temperature of 10 to 18° C. (the pH is maintained with about 50 parts of sodium bicarbonate). In a separate reaction, 18.4 parts of cyanuric chloride are suspended in ice-water and acylated with 4.2 parts of cyanoamine at 0 to 5° C. and a pH of 7 to 10. The resulting product is then further acylated with 31.9 parts of 2-amino-5-hydroxynaphthalene-1,7-disulfonic acid in weakly acidic solution at a temperature of 20 to 40° C. The resulting 2-(4'-chloro-6'-cyanamino-1',3', 5'-triazin-2'-yl)amino-5-hydroxynaphthalene-1,7-disulfonic acid coupler solution is added to the above coupling mixture and the pH is raised to 3 to 6 with sodium carbonate at a temperature below 20° C.

A deep black dye solution is obtained containing the dyes of formulae (A) and (C) mentioned in Example 1 in the ratio of 90%:10%. This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on wool.

EXAMPLE 5

7,9 parts of an electrolyte-containing dye powder which contains the orange-dyeing monoazo dye of the abovementioned formula (B) in a proportion of 70% and 7,9 parts of an electrolyte-containing dye powder which contains the orange-dyeing monoazo dye of the abovementioned formula (C) in a proportion of 70% are mechanically mixed with 200 parts of an electrolyte-containing dye powder which contains the navy-dyeing disazo dye of the formula (A) in a proportion of 50% to afford a dye mixture according to the invention, which when employed according to the application and fixing methods customary in the art for fiber-reactive dyes, produces for example on wool fiber materials dyeings in deep black shades.

EXAMPLE 6

The mixture described in Example 5 is mixed for the purpose of shading with 15 parts of an electrolyte-containing dye powder which contains the yellow-dyeing monoazo dye of the formula (D)

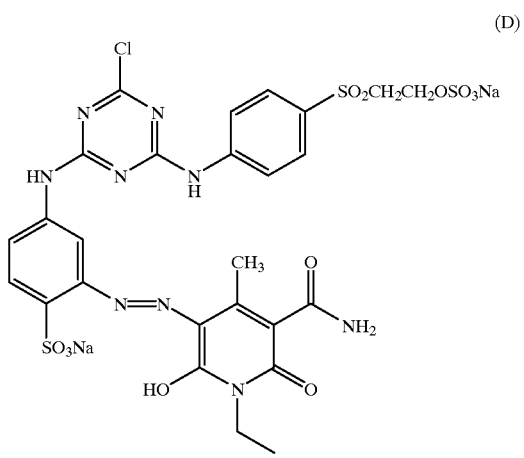

(D)

in a proportion of 50% are mechanically mixed with one another. The dye mixture according to the invention, employed by the application and fixing methods customary in the art for fiber-reactive dyes, produces for example on wool black dyeings with a slightly-greenish tint.

EXAMPLES 7

The mixture described in Example 5 is mixed for the purpose of shading with 10 parts of an electrolyte-containing dye powder which contains the red-dyeing monoazo dye of the formula (E)

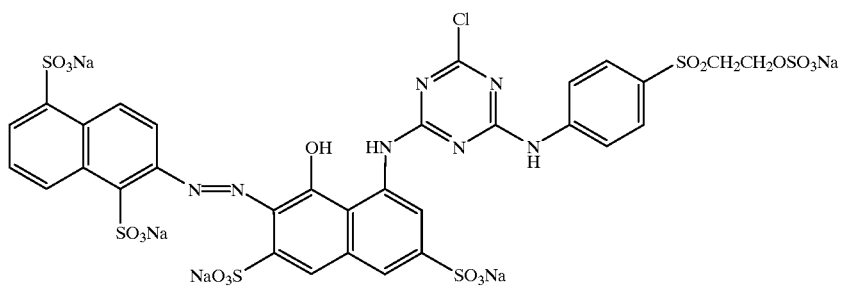

(E)

in a proportion of 50% are mechanically mixed with one another. The dye mixture according to the invention, employed by the application and fixing methods customary in the art for fiber-reactive dyes, produces for example on wool black dyeings with a slightly-reddish tint.

EXAMPLES 8 to 19

The Table Examples which follow describe further novel dye mixtures of the dyes conforming to the general formulae (1) and (2), and optionally of formulae (3a) or (3b) or both, indicated herein generally as formula (3), in terms of the components of these dyes, in which M has one of the above-mentioned meanings, preferably being an alkali metal, such as sodium, R is hydrogen and Z is cyanoamino, and their mixing ratios. When employed according to the application and fixing methods customary in the art for fiber-reactive dyes, these dye mixtures produce, for example, on cellulose fiber materials, deep black dyeings.

| Ex. | Radical (4) | Radical (5) | Radical (6) | Ratio of (1):(2):(3) |
|---|---|---|---|---|
| 8 | 2-methoxy-5-(β-sulfatoethylsulfonyl)-phenyl | 4-(β-sulfato-ethylsulfonyl)-phenyl | 2-sulfo-4-(β-sulfatoethyl-sulfonyl)-phenyl | 85:15:0 |
| 9 | 2-sulfo-4-(β-sulfatoethylsulfonyl)-phenyl | 4-(β-sulfato-ethylsulfonyl)-phenyl | 4-(β-sulfato-ethylsulfonyl)-phenyl | 85:14:1 |
| 10 | 2-carboxy-4-(β-sulfatoethylsulfonyl)-phenyl | 4-(β-sulfato-ethylsulfonyl)-phenyl | 4-(β-sulfato-ethylsulfonyl)-phenyl | 80:19:1 |
| 11 | 2-methoxy-5-methyl-4-(β-sulfatoethyl-sulfonyl)-phenyl | 4-(β-sulfato-ethylsulfonyl)-phenyl | 4-(β-sulfato-ethylsulfonyl)-phenyl | 80:19:1 |
| 12 | 2,5-dimethoxy-4-(β-sulfatoethyl-sulfonyl)-phenyl | 4-(β-sulfato-ethylsulfonyl)-phenyl | 4-(β-sulfato-ethylsulfonyl)-phenyl | 90:10:0 |
| 13 | 4-(β-sulfatoethyl-sulfonyl)-phenyl | 3-(β-sulfato-ethylsulfonyl)-phenyl | 3-(β-sulfato-ethylsulfonyl)-phenyl | 87:12:1 |
| 14 | 2-sulfo-4-(β-sulfato-ethylsulfonyl)-phenyl | 4-(β-sulfato-ethylsulfonyl)-phenyl | 2-methoxy-5-(β-sulfatoethyl-sulfonyl)-phenyl | 89:11:0 |
| 15 | 2-sulfo-4-(β-sulfato-ethylsulfonyl)-phenyl | 4-(β-sulfato-ethylsulfonyl)-phenyl | 2-methoxy-5-methyl-4-(β-sulfatoethyl-sulfonyl)-phenyl | 75:25:0 |
| 16 | 2-sulfo-4-(β-sulfato-ethylsulfonyl)-phenyl | 4-(β-sulfato-ethylsulfonyl)-phenyl | 3-(β-sulfatoethyl-sulfonyl)-phenyl | 82:18:0 |
| 17 | 4-(β-sulfatoethyl-sulfonyl)-phenyl | 4-(β-sulfato-ethylsulfonyl)-phenyl | 2-sulfo-4-(β-sulfato-ethylsulfonyl)-phenyl | 88:12:0 |
| 18 | 2-methoxy-5-(β-sulfatoethylsulfonyl)-phenyl | 4-(β-sulfato-ethylsulfonyl)-phenyl | 2-carboxy4-(β-sulfatoethylsulfonyl)-phenyl | 80:20:0 |
| 19 | 4-(p-sulfatoethyl-sulfonyl)-phenyl | 4-(β-sulfato-ethylsulfonyl)-phenyl | 4-(β-sulfatoethyl-sulfonyl)-phenyl | 77:22.5:0.5 |

EXAMPLES 20 to 31

The Table Examples which follow describe further novel dye mixtures of the dyes 5 conforming to the general formulae (1) and (2), and optionally of formulae (3a) or (3b) or both, indicated herein generally as formula (3), in terms of the components of these dyes, in which M has one of the above-mentioned meanings, preferably an alkali metal, such as sodium, R is sulfo and Z is cyanoamino, and their mixing ratios. When employed according to the application and fixing methods customary in the art for fiber-reactive dyes, these dye mixtures produce, for example, on cellulose fiber materials, deep black dyeings.

| Ex. | Radical (4) | Radical (5) | Radical (6) | Ratio of (1):(2):(3) |
|---|---|---|---|---|
| 20 | 2-methoxy-5-(β-sulfatoethylsulfonyl)-phenyl | 4-(β-sulfato-ethylsulfonyl)-phenyl | 2-sulfo-4-(β-sulfatoethyl-sulfonyl)-phenyl | 85:15:0 |
| 21 | 2-sulfo-4-(β-sulfatoethylsulfonyl)-phenyl | 4-(β-sulfato-ethylsulfonyl)-phenyl | 4-(β-sulfato-ethylsulfonyl)-phenyl | 85:14:1 |
| 22 | 2-carboxy-4-(β-sulfatoethylsulfonyl)-phenyl | 4-(β-sulfato-ethylsulfonyl)-phenyl | 4-(β-sulfato-ethylsulfonyl)-phenyl | 80:19:1 |
| 23 | 2-methoxy-5-methyl-4-(β-sulfatoethyl-sulfonyl)-phenyl | 4-(β-sulfato-ethylsulfonyl)-phenyl | 4-(β-sulfato-ethylsulfonyl)-phenyl | 80:19:1 |
| 24 | 2,5-dimethoxy-4-(β-sulfatoethyl-sulfonyl)-phenyl | 4-(β-sulfato-ethylsulfonyl)-phenyl | 4-(β-sulfato-ethylsulfonyl)-phenyl | 90:10:0 |
| 25 | 4-(β-sulfatoethyl-sulfonyl)-phenyl | 3-(β-sulfato-ethylsulfonyl)-phenyl | 3-(β-sulfato-ethylsulfonyl)-phenyl | 87:12:1 |
| 26 | 2-sulfo-4-(β-sulfato-ethylsulfonyl)-phenyl | 4-(β-sulfato-ethylsulfonyl)-phenyl | 2-methoxy-5-(β-sulfatoethyl-sulfonyl)-phenyl | 89:11:0 |
| 27 | 2-sulfo-4-(β-sulfato-ethylsulfonyl)-phenyl | 4-(β-sulfato-ethylsulfonyl)-phenyl | 2-methoxy-5-methyl-4-(β-sulfatoethyl-sulfonyl)-phenyl | 75:25:0 |
| 28 | 2-sulfo-4-(β-sulfato-ethylsulfonyl)-phenyl | 4-(β-sulfato-ethylsulfonyl)-phenyl | 3-(β-sulfatoethyl-sulfonyl)-phenyl | 82:18:0 |
| 29 | 4-(β-sulfatoethyl-sulfonyl)-phenyl | 4-(β-sulfato-ethylsulfonyl)-phenyl | 2-sulfo-4-(β-sulfato-ethylsulfonyl)-phenyl | 88:12:0 |
| 30 | 2-methoxy-5-(β-sulfatoethylsulfonyl)-phenyl | 4-(β-sulfato-ethylsulfonyl)-phenyl | 2-carboxy4-(β-sulfatoethylsulfonyl)-phenyl | 80:20:0 |
| 31 | 4-(β-sulfatoethyl-sulfonyl)-phenyl | 4-(β-sulfato-ethylsulfonyl)-phenyl | 4-(β-sulfatoethyl-sulfonyl)-phenyl | 77:22.5:0.5 |

EXAMPLE 32

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 143 parts of 1-amino-8-naphthol-3,6-disulfonic acid is added and the first coupling is carried out at a pH between 1 and 1.3 and at a temperature below 20° C. (the pH is maintained with about 50 parts of sodium bicarbonate). (n a separate reaction, 18.4 parts of cyanuric chloride is suspended in ice-water and acylated with 23.9 parts of 7-amino4-hydroxy-naphthalene-2-sulfonic acid in weakly acidic solution at a temperature of 0 to 20° C. and then further acylated with 8,7 parts morpholin at a pH of 7 to 8 and a temperature of 20 to 40° C. The resulting 7-(4'-chloro-6'-morpholino-1', 3', 5'-triazin-2'-yl)amino4-hydroxynaphthalene-2-sulfonic acid coupler solution is added to the above coupling mixture and the pH is raised to 3 to 6 with sodium carbonate at a temperature below 20° C.

A deep black dye solution is obtained containing the dye of formulae (A) as mentioned in Example 1, and the dye of formula (F) as shown below in the ratio of 90%:10%.

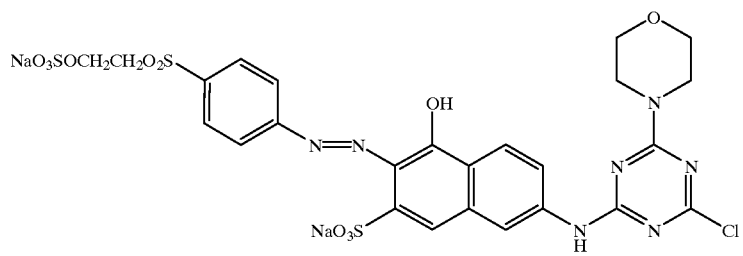

(F)

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on wool.

EXAMPLE 32a:

The method described in Example 32 can be used to prepare a similar dye mixture by varying the amount of starting compounds, for example the amount of 1-amino-8-naphthol-3,6-disulfonic acid in an amount of 119.6 parts, the amount of 7-amino4-hydroxy-2-napthalenesulfonic acid in an amount of 59.8 parts, the amount of cyanuric chloride in an amount of 46 parts, and morpholin in an amount of 22 parts. A dye mixture is obtained in which the dyes of formulae (A) and (F) are present in the ratio of about 75%:25%. The dye mixture can be isolated from the synthesis by spray-drying to produce for example on wool fiber materials dyeings in deep black shades.

EXAMPLE 33

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 143 parts of 1-amino-8-naphthol-3,6-disulfonic acid are added and the first coupling is carried out at a pH between 1 and 1.3 and at a temperature below 20° C. (the pH is maintained with about 50 parts of sodium bicarbonate). In a separate reaction, 18.4 parts of cyanuric chloride are suspended in ice-water and acylated with 31.9 parts of 2-amino-5-hydroxy-naphthalene-1,7-disulfonic acid in weakly acidic solution at a temperature of 0 to 20° C. and then further acylated with 8,7 parts morpholine at a pH of 7 to 8 and a temperature of 20 to 40° C. The resulting 2-(4'-chloro-6'-morpholino-1',3', 5'-triazin-2'-yl)amino-5-hydroxynaphthalene-1,7-disulfonic acid coupler solution is added to the above coupling mixture and the pH is raised to 3 to 6 with sodium carbonate at a temperature below 20° C.

A deep black dye solution is obtained containing the dyes of formulae (A) and (G) in the ratio of 90%:10%

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on wool.

EXAMPLE 34

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 135 parts of 1-amino-8-naphthol-3,6-disulfonic acid are added and the first coupling is carried out at a pH between 1 and 1.3 and at a temperature below 20° C. (the pH is maintained with about 50 parts of sodium bicarbonate). In a separate reaction, 27.6 parts of cyanuric chloride are suspended in ice-water and acylated with 47.9 parts of 2-amino-5-hydroxy-naphthalene-1,7-disulfonic acid in weakly acidic solution at a temperature of 0 to 20° C. and then further acylated with 15,8 parts N,N-diethanolamine at a pH of 7 to 8 and a temperature of 20 to 40° C. The resulting 2-(4'-chloro-6'-N',N'-diethanolamino-1',3', 5'-triazin-2'-yl)amino-5-hydroxynaphthalene-1,7-disulfonic acid coupler solution is added to the above coupling mixture and the pH is raised to 3 to 6 with sodium carbonate at a temperature below 20° C.

A deep black dye solution is obtained containing the dyes of formulae (A) and (H) in the ratio of 85%:15%.

The dye mixture can be isolated from the synthesis by spray-drying to produce for example on wool fiber materials dyeings in deep black shades.

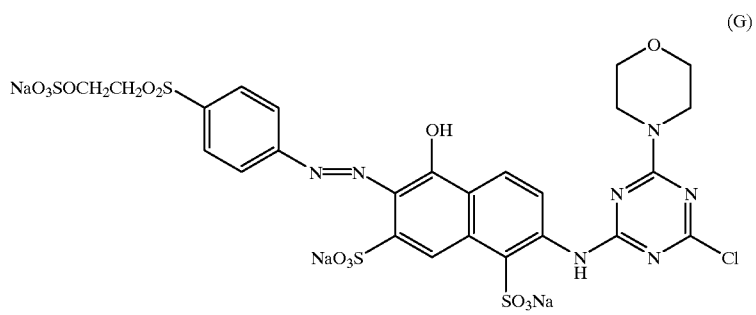

(G)

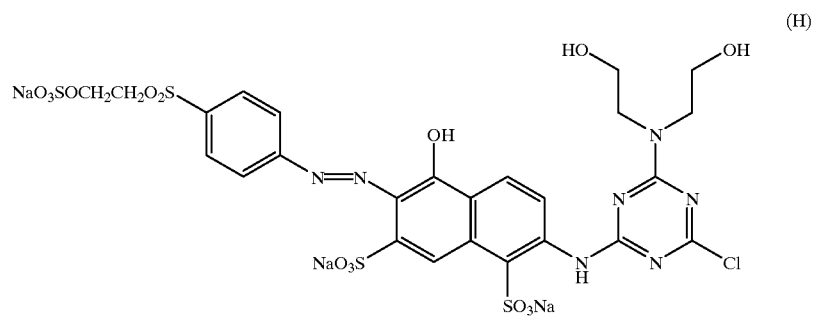

(H)

EXAMPLE 35

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 135 parts of 1-amino-8-naphthol-3,6-disulfonic acid are added and the first coupling is carried out at a pH between 1 and 1.3 and at a temperature below 20° C. (the pH is maintained with about 50 parts of sodium bicarbonate). In a separate reaction, 27.6 parts of cyanuric chloride are suspended in ice-water and acylated with 47.9 parts of 7-amino4-hydroxynaphthalene-2-sulfonic acid in weakly acidic solution at a temperature of 0 to 20° C. and then further acylated with 19 parts N,N-diethanolamine at a pH of 7 to 8 and a temperature of 20 to 40° C. The resulting 7-[4'-chloro-6'-(N',N'-diethanolamino)-1',3', 5'-triazin-2'-yl]amino-4-hydroxynaphthalene-2-sulfonic acid coupler solution is added to the above coupling mixture and the pH is raised to 3 to 6 with sodium carbonate at a temperature below 20° C.

A deep black dye solution is obtained containing the dyes of formulae (A) and (J) in the ratio of 85%:15%.

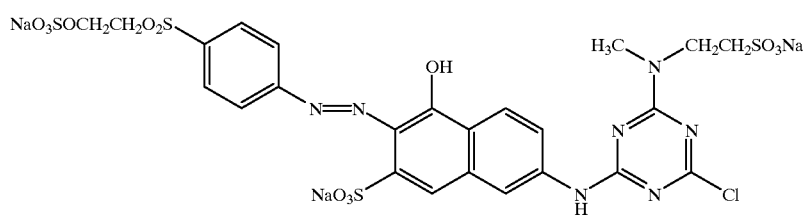

(J)

The dye mixture can be isolated from the synthesis by spray-drying to produce, for example, on wool fiber materials dyeings in deep black shades.

What is claimed is:

1. A dye mixture comprising one or more disazo dyes conforming to the general formula (1) and one or more monoazo dyes conforming to the general formula (2)

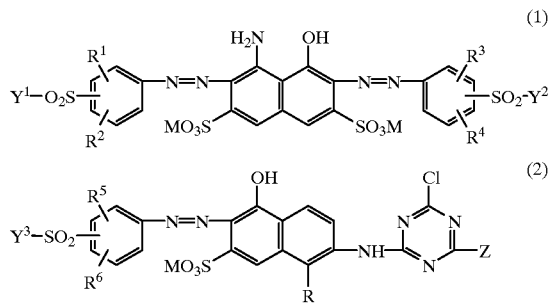

wherein:
$R^1$ is hydrogen, methyl, ethyl, methoxy, ethoxy, sulfo or carboxy;
$R^2$ is hydrogen, methyl, ethyl, methoxy, ethoxy, sulfo or carboxy;
$R^3$ is hydrogen, methyl, ethyl, methoxy, ethoxy, sulfo or carboxy;
$R^4$ is hydrogen, methyl, ethyl, methoxy, ethoxy, sulfo or carboxy;
$R^5$ is hydrogen, methyl, ethyl, methoxy, ethoxy, sulfo or carboxy;
$R^6$ is hydrogen, methyl, ethyl, methoxy, ethoxy, sulfo or carboxy;
$Y^1$ is vinyl, or is ethyl substituted in the β-position by a substituent which is eliminated by the action of an alkali, forming the vinyl group;
$Y^2$ has one of the meanings of $Y^1$;
$Y^3$ has one of the meanings of $Y^1$;
R is hydrogen or sulfo;
Z is cyanoamino, morpholino or a group of the general formula (20)

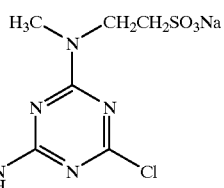

wherein
$R^7$ is hydrogen, alkyl of 1 to 4 carbon atoms, cyclohexyl, alkoxyalkyl of 3 to 6 carbon atoms, hydroalkyl of 2 to 4 carbon atoms or sulfoalkyl of 1 to 4 carbon atoms and $R^8$ has one of the meanings given for $R^7$;
M is hydrogen or an alkali metal;
the dye, respectively dyes, of the general formula (1) being present in the mixture in an amount of from 50 to 95% by weight, and the dye, respectively dyes, of the general formula (2) being present in the dye mixture in an amount of from 5 to 50% by weight.

2. A dye mixture according to claim 1 comprising one or more disazo dyes of formula (1) in a total amount from 75 to 90% by weight and and one or more monozo dyes of the formula (2) in a total amount of from 10 to 25% by weight.

3. A dye mixture according to claim 1 comprising dyes of the general formula (2) with R being hydrogen as well as R being sulfo.

4. A dye mixture according to claim 1, wherein $R^1$, $R^3$ and $R^5$ are each independently of one another hydrogen or methoxy, and $R^2$, $R^4$ and $R^6$ are each hydrogen.

5. A dye mixture according to claim 1, wherein $R^1$, $R^2$, $R^3$, $R^4$, $R^5$ and $R^6$ are each hydrogen.

6. A dye mixture according to claim 1, wherein Z is cyanoamino.

7. A dye mixture according to claim 1, wherein Z is morpholino.

8. A dye mixture according to claim 1, wherein $Y^1$, $Y^2$ and $Y^3$ are each, independently of the others, vinyl, or ethyl substituted in the β-position by chlorine, thiosulfato, sulfato, alkanoyloxy of 2 to 5 carbon atoms, phosphate, sulfobenzoyloxy or p-toluylsulfonyloxy.

9. A dye mixture according to claim 1, wherein $Y^1$, $Y^2$ and $Y^3$ are each, independently of the others, vinyl or β-sulfatoethyl.

10. A dye mixture according to claim 1, wherein the groups —$SO_2$—$Y^1$, —$SO_2$—$Y^2$ and —$SO_2$—$Y^3$ being bonded to the benzene nucleus in meta- or para-position to the azo groups.

11. A dye mixture according to claim 1, wherein the groups —$SO_2$—$Y^1$, —$SO_2$—$Y^2$ and —$SO_2$—$Y^3$ being bonded to the benzene nucleus in para-position to the azo groups.

12. A process for dyeing hydroxy- and/or carboxamido-containing fiber material which comprises applying the dye mixture as claimed in claim 1 to the material and the dyes are fixed to the material by means of heat or with the aid of an alkali or by means of heat and with the aid on an alkali.

* * * * *